No. 761,881. PATENTED JUNE 7, 1904.
V. H. ERNST.
SPANNER WRENCH.
APPLICATION FILED APR. 15, 1903.
NO MODEL.

Attest:
Mabelle F. Lake
C. C. Chipman

Inventor:
Victor H. Ernst
by Edith J. Griswold
Atty.

No. 761,881. Patented June 7, 1904.

UNITED STATES PATENT OFFICE.

VICTOR H. ERNST, OF JERSEY CITY, NEW JERSEY.

SPANNER-WRENCH.

SPECIFICATION forming part of Letters Patent No. 761,881, dated June 7, 1904.

Application filed April 15, 1903. Serial No. 152,653. (No model.)

*To all whom it may concern:*

Be it known that I, VICTOR H. ERNST, a citizen of the United States, and a resident of Jersey City, Hudson county, State of New Jersey, have invented Improvements in Spanner-Wrenches, of which the following is a specification.

This invention relates to spanner-wrenches, and has for its object to provide a strong efficient spanner adapted to be readily adjusted for use with nuts of different diameters.

To accomplish my object, I make the wrench-head of the spanner rigid or integral with the stock and constructed to engage with a nut, and I provide a movable bearing adjustable both longitudinally and laterally relative to the wrench-head, this second bearing being also adapted to permit of an elastic release when the spanner is moved backward to get a new hold on the nut.

In the accompanying drawings I have shown the construction of one form of spanner having my improvements applied thereto; but I do not limit myself to any particular detail of form or construction beyond what is called for by the claims hereto appended.

Figure 1:
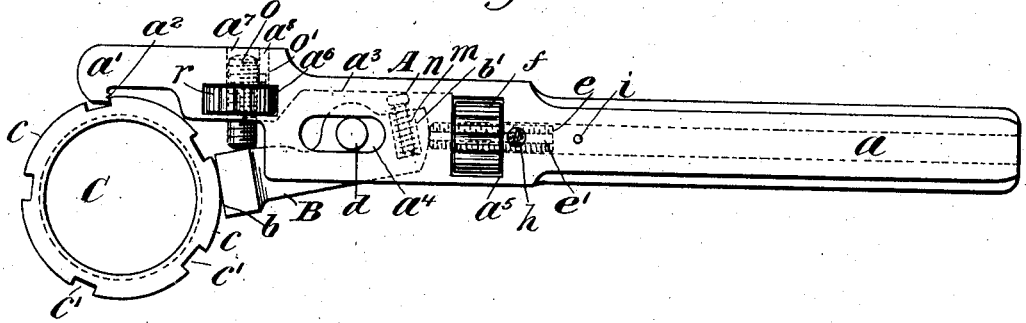
Figure 2:
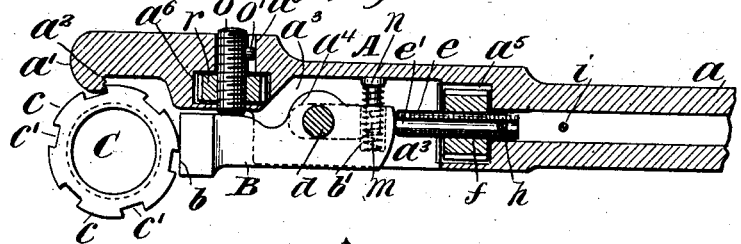
Figure 3:

Figure 1 is a side view of one form of a spanner-wrench containing my improvements shown in operative adjustment with a nut. Fig. 2 is a longitudinal section of the spanner, showing its adjustment for use with a nut of smaller diameter. Fig. 3 is a face view of the spanner looking in the direction of arrow 3, Fig. 2.

Referring to the drawings, the stock A (here shown in one piece) is formed into a handle portion $a$ at one end and a wrench-head $a'$ at the other end and is provided with grooves and recesses to hold the movable bearing and its adjusting mechanism, as hereinafter explained.

The wrench-head $a'$ may be constructed in any suitable manner to engage with a nut and preferably to make a positive engagement therewith. As shown by way of example, the wrench-head $a'$ is constructed to make a ratchet connection with a nut, the gripping edge $a^2$ being adapted to engage the sides of teeth $c$, formed by longitudinal grooves $c'$ in a nut $c$. As shown, this gripping edge $a^2$ is preferably serrated crosswise of the tool to secure a firm grip on the edge of the tooth $c$; but this is not essential.

The second and movable bearing is in the form of a follower B, provided with a face $b$ to make contact with the periphery of the nut. As here shown, this bearing-face $b$ is flat; but, as will be evident, it may be of any desirable contour. By my present invention the follower B is made so adjustable that the same spanner may be used with nuts of different sizes in diameter and yet in its various adjustments maintain such relation between the edge $a^2$ and the contact or bearing face $b$ that the spanner embraces approximately a quarter of the circumference of any one of the various-sized nuts it may act upon.

As shown in the drawings, the follower B is mounted on a movable fulcrum in a recess $a^3$ in the stock A. This fulcrum consists of a pin $d$, passing through a perforation in the follower and through slots $a^4$, cut through each side of the stock, into the recess $a^3$. By making this pin and the perforation slightly tapered a hammer-blow upon the larger end of the pin will firmly secure these parts together and a blow upon the smaller end will loosen the pin sufficiently for the tool to be taken apart. The pin $d$ is of such a length that its two ends are guided in the slots $a^4$ on each side of the stock A, Fig. 3, and these elongated slots $a^4$ permit of the longitudinal movement of the follower toward and from the gripping edge $a^2$, the recess $a^3$ being open at the head end of the stock A and the follower B projecting beyond the recess. To make this longitudinal adjustment, I preferably use an actuating-screw $e$, guided at one end in an aperture in the handle $a$ and at the other end adapted to bear against the follower B, said screw being operated by an adjusting-nut $f$ in the recess $a^5$ in the stock A. The screw $e$ is prevented from turning by the pin-screw $h$ screwing through a hole in the stock and entering a longitudinal groove $e'$ in the screw $e$. A stop-pin $i$, driven through the stock A, crosses the aperture in the handle $a$ and limits the backward movement of the actuating-screw $e$. The recess $a^5$ is open at each side of the stock, and the nut $f$ is of a size that it may be readily rotated by the thumb and a finger of the hand holding the spanner.

The recess $a^3$ is cut deep enough, Figs. 1 and 2, to allow the follower B to turn on the pin $d$ as a pivot in any position the pin $d$ may occupy in the slots $a^4$. This permits of the lateral adjustment of the follower, and by making this follower spring-actuated in one direction I obtain the elastic release, as hereinafter explained.

With the construction shown in the drawings a coiled spring $m$, partly held and guided in a hole $b'$ in the follower, is compressed between the end wall of the hole and the head of a buffer $n$, so that this buffer is forced by the spring against the inner wall of the recess $a^3$. This spring $m$ being at the rear end of the follower beyond the pivot-pin $d$ normally tends to force the outer end of the follower laterally toward the wrench-head.

To make the positive lateral adjustment of the follower, I have shown an actuating-screw $o$, guided in a perforation $a^7$ in the stock, having one end bearing against the outer end of follower B and capable of being moved lengthwise by the adjusting-nut $r$, working on the screw $o$ in a recess $a^6$, cut through the stock. A pin $o'$ on the screw $o$ engages in a groove $a^8$ at the side of the perforation $a^7$ and prevents the screw $o$ from rotating with the nut $r$.

The adjustment of the spanner is made as follows: The actuating-screw $e$ is drawn down into the handle-aperture, and the follower B is also moved down—that is, to the right in the position shown in the drawings. The gripping edge $a^2$ is then placed upon the edge of a tooth $c$ of the nut, the edge of the tooth generally catching in one of the indentations on this edge, the laterally-adjusting nut $r$ turned until the actuating-screw $o$ has forced the upper end of the follower B outward until it reaches a position approximately in line with the diameter of the nut at right angles to the diameter passing through the point of contact at $a^2$, and then the adjusting-nut $f$ is turned until the actuating-screw $e$ has forced the follower up against the periphery of the nut. By these two adjustments, lateral and longitudinal, of one follower B, I obtain a spanner that will effectively grip various-sized nuts. Also when the spanner is taken from the nut or when the wrench-head is moved from engagement with one tooth $c$ to engagement with the next tooth to take a new hold when tightening or loosening the nut the spring $m$ will permit the upper end of the follower to give outwardly—that is, to slip backward on the periphery of the nut and thus readily release the grip of the spanner on the nut without disturbing the adjustment.

From the foregoing it will be seen that the pull on the nut in wrenching is exerted by the strongest part of the spanner—the stock itself—that the adjustments of the second bearing make up for the different contours and sizes of the nuts, and that while the lateral adjustment is positive for the action of the tool in wrenching it is resilient for the releasing action, so that neither of the two adjustments of the spanner need be disturbed even if the wrench-head is constructed to make a more tightly locked connection with the nut.

It will be evident that various modifications may be made in form and construction without departing from my invention.

I claim as my invention—

1. In a spanner-wrench, the combination with a stock provided with a wrench-head, forming the outer, working jaw of the wrench, of a follower carried by said stock, and means for positively adjusting the said follower in two different directions.

2. In a spanner-wrench, the combination with a stock provided with a wrench-head, forming the outer, working jaw of the wrench, of a pivoted follower having its pivot bearing in said stock, said follower being spring-actuated in one direction, and means for positively adjusting the follower in the opposite direction.

3. In a spanner-wrench, the combination with a stock provided with a wrench-head, forming the outer, working jaw of the wrench, of a pivoted follower having its pivot bearing in said stock and means for positively adjusting the follower laterally and longitudinally relative to said wrench-head.

4. In a spanner-wrench, the combination with a stock provided with a wrench-head, forming the outer, working jaw of the wrench, of a pivoted follower having its pivot bearing in said stock and capable of a longitudinal movement therein, means for positively adjusting said follower longitudinally, a spring tending to turn said follower on its pivot in one direction and means for positively adjusting it in the opposite direction.

In testimony whereof I have signed my name to this specification in the presence of two subscribing witnesses.

VICTOR H. ERNST.

Witnesses:
 EDITH J. GRISWOLD,
 MABELLE F. LAKE.